(12) United States Patent
Fazekas et al.

(10) Patent No.: US 8,517,051 B2
(45) Date of Patent: Aug. 27, 2013

(54) AUTOMATIC FLOW CONTROL REGULATOR VALVE

(75) Inventors: Dale Fazekas, Indianapolis, IN (US); Robert Knerr, Indianapolis, IN (US); William Prati, Tucson, AZ (US)

(73) Assignee: Nexus Valve Inc., Indianapolis, IN (US)

( * ) Notice: Subject to any disclaimer, the term of this patent is extended or adjusted under 35 U.S.C. 154(b) by 737 days.

(21) Appl. No.: 11/868,478

(22) Filed: Oct. 6, 2007

(65) Prior Publication Data
US 2008/0083463 A1    Apr. 10, 2008

Related U.S. Application Data

(60) Provisional application No. 60/928,252, filed on May 8, 2007, provisional application No. 60/850,316, filed on Oct. 7, 2006.

(51) Int. Cl.
F16K 21/02    (2006.01)
(52) U.S. Cl.
USPC .......................... 137/517; 137/542; 137/513.3
(58) Field of Classification Search
USPC ................... 137/517, 541, 542, 543, 543.13, 137/543.17, 513.3
See application file for complete search history.

(56) References Cited

U.S. PATENT DOCUMENTS

| | | | |
|---|---|---|---|
| 2,591,060 A * | 4/1952 | Garretson | 137/513.3 |
| 3,561,471 A * | 2/1971 | Sands | 137/498 |
| 3,590,851 A * | 7/1971 | Bogossian et al. | 137/223 |
| 3,794,077 A | 2/1974 | Fanshier | |
| 3,837,362 A * | 9/1974 | Barnes | 138/45 |
| 4,699,166 A * | 10/1987 | Gold et al. | 137/2 |
| 5,301,710 A | 4/1994 | Marandi | |
| 6,550,495 B1 | 4/2003 | Schulze | |
| 7,140,386 B2 * | 11/2006 | Avis et al. | 137/504 |
| 2001/0045232 A1 | 11/2001 | Svehaug | |
| 2002/0100506 A1 | 8/2002 | May | |
| 2002/0162589 A1 | 11/2002 | Lorch et al. | |

OTHER PUBLICATIONS

Griswold Controls; Specification Sheets; various valve products, available at www.griswoldcontrols.com, Oct. 2004.

* cited by examiner

*Primary Examiner* — Kevin Lee
*Assistant Examiner* — Macade Brown
(74) *Attorney, Agent, or Firm* — E. Victor Indiano; Indiano Law Group, LLC

(57) ABSTRACT

A flow control valve includes a body portion including a first end, a second end and an axially extending passageway. A metering valve is included that is axially moveable under the influence of fluid pressure from a rest position to a flow restricting position. In the flow restricting position, the metering valve can restrict the flow of fluid through the axially extending passageway. The metering valve includes an upstream portion and a downstream portion. The upstream portion has a flattened top spherical shape. A biasing device is provided that normally biases the metering valve in the rest position, and for provides resistance to movement of the metering valve to the flow restricting position.

23 Claims, 10 Drawing Sheets

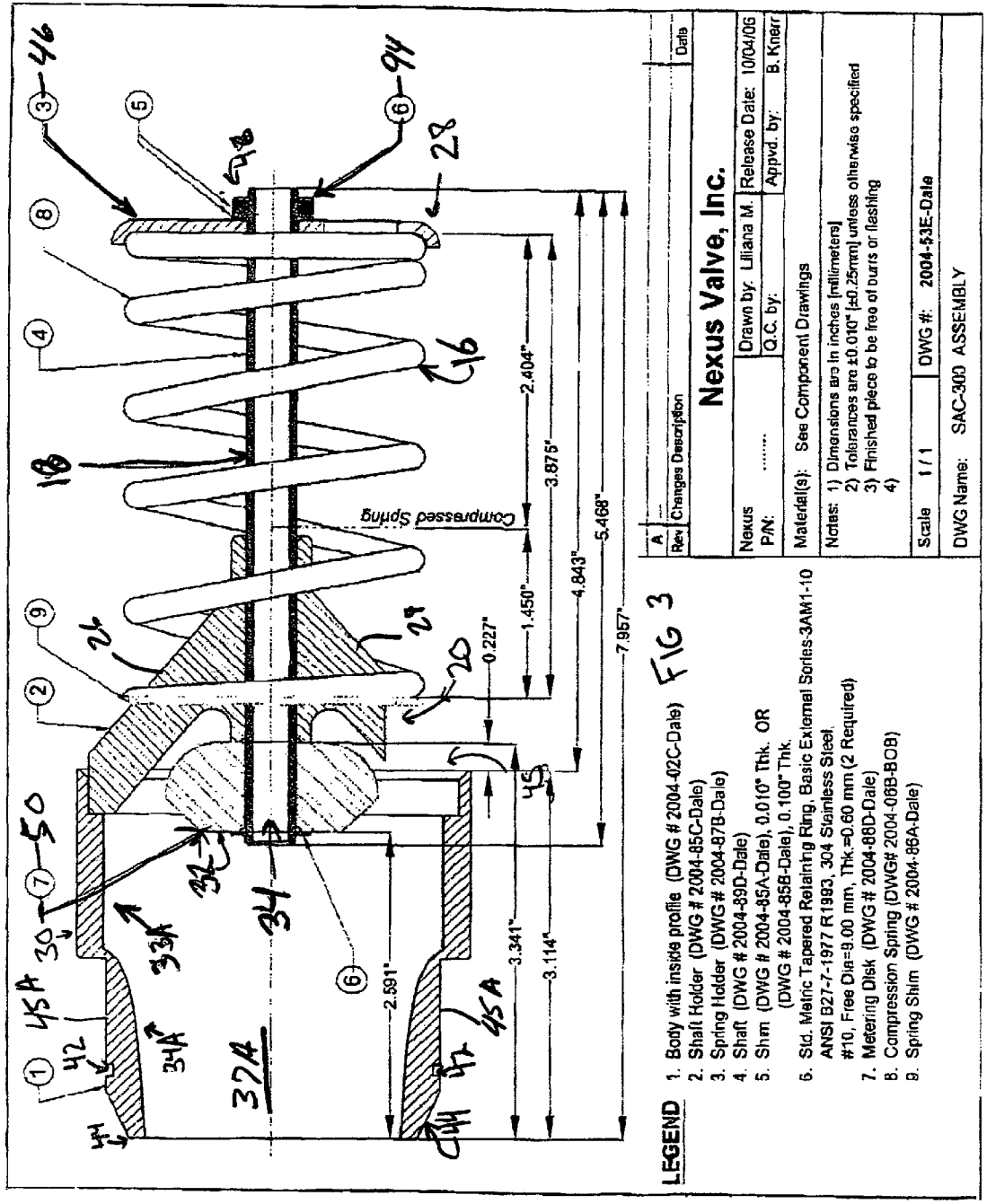

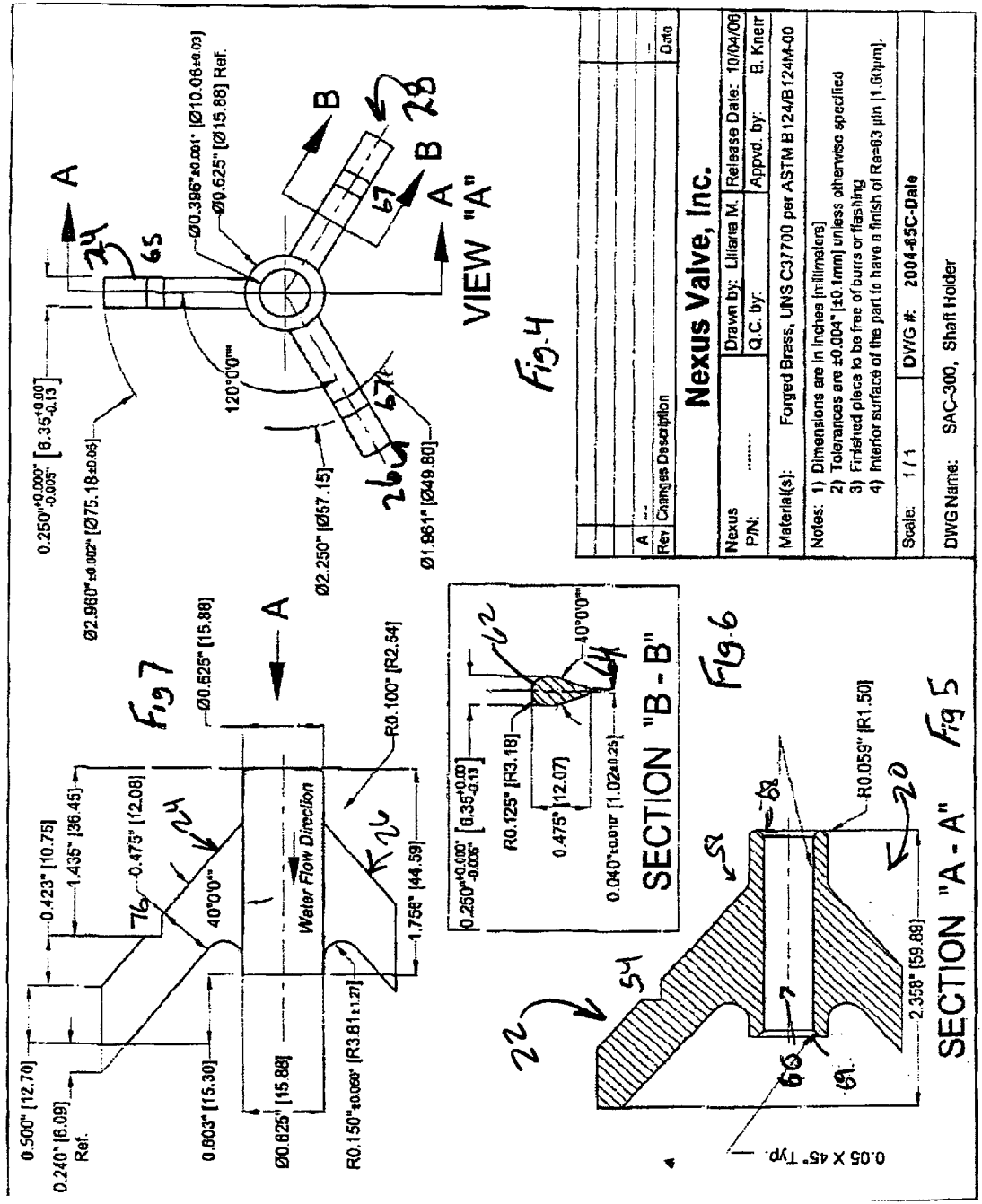

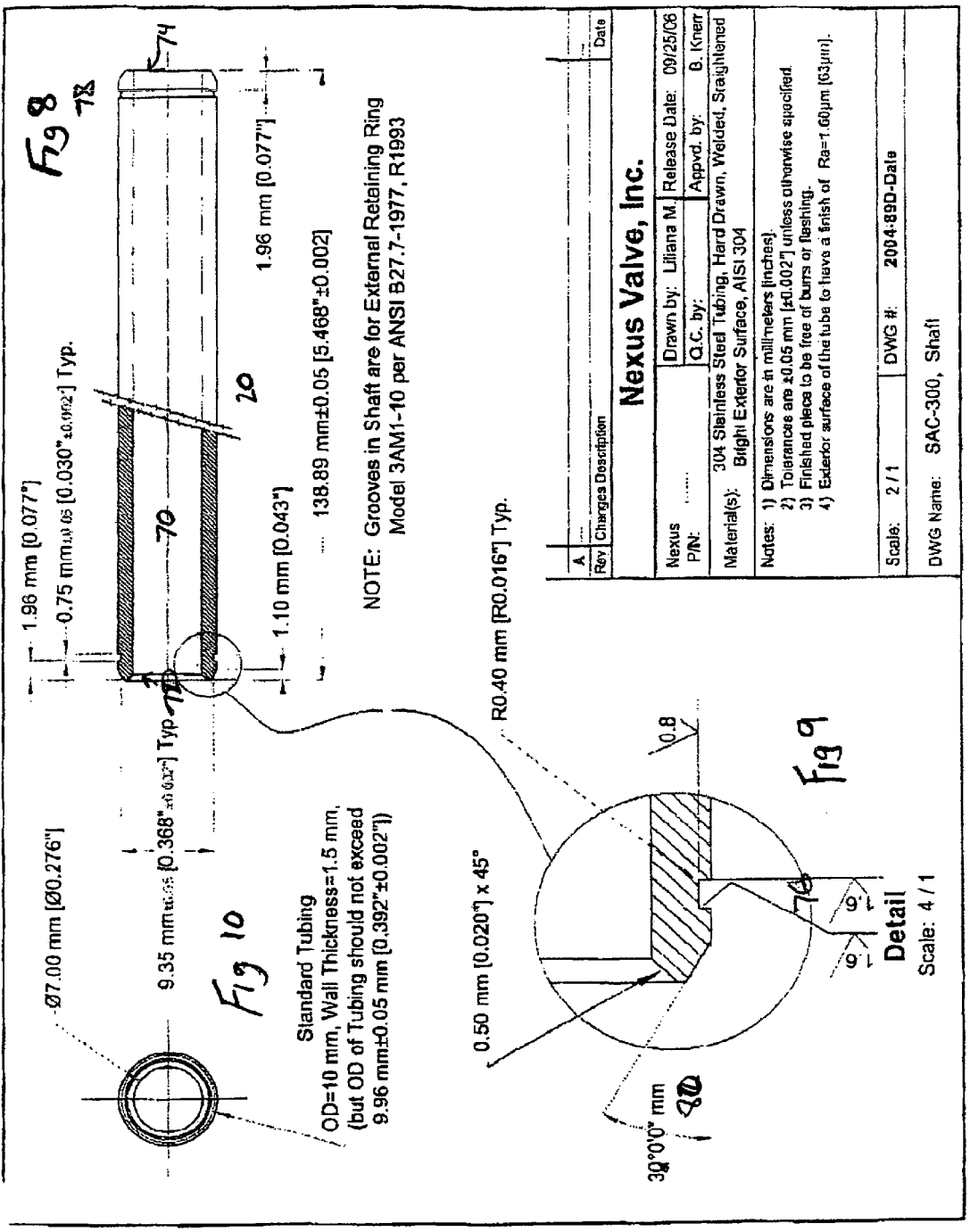

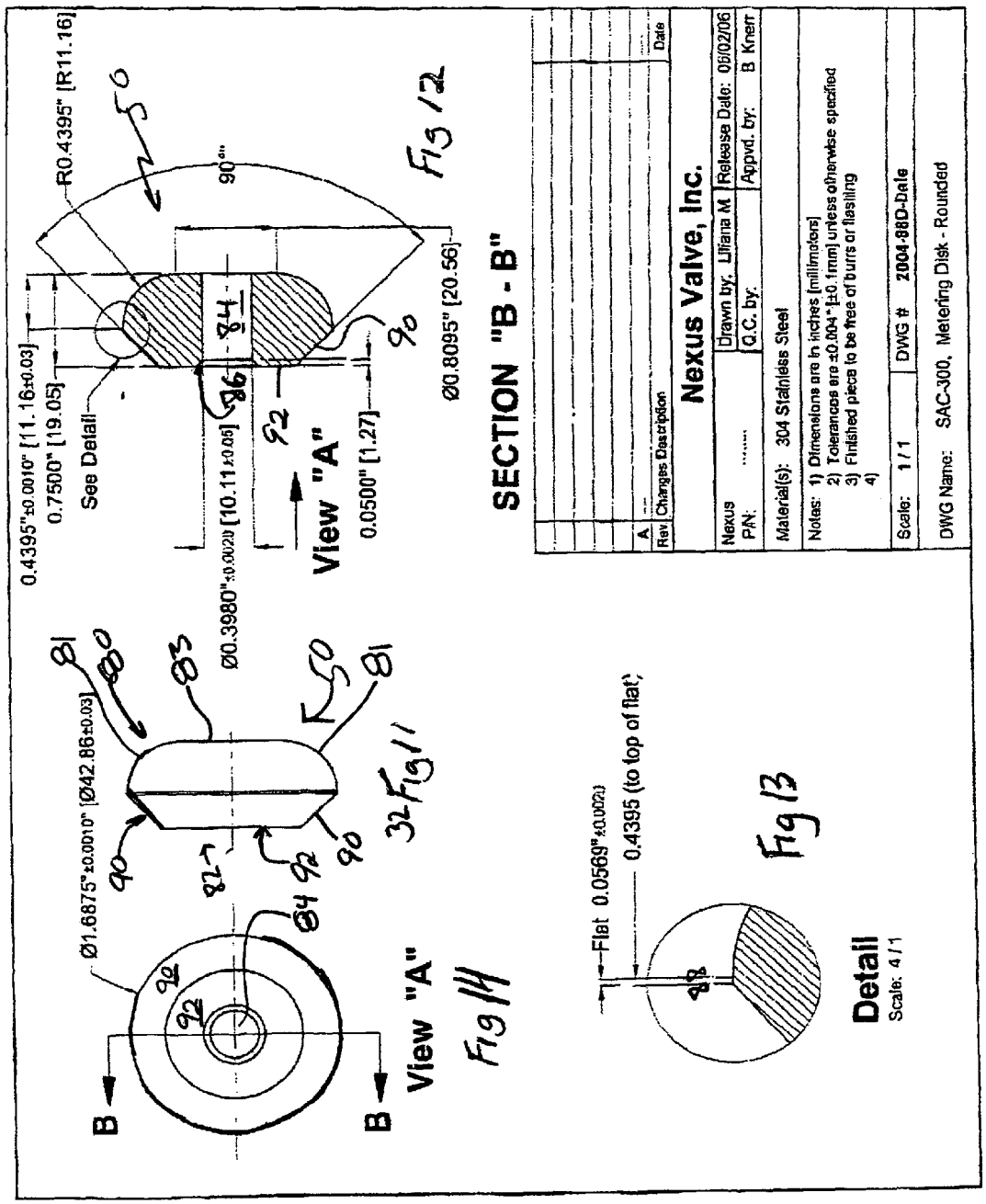

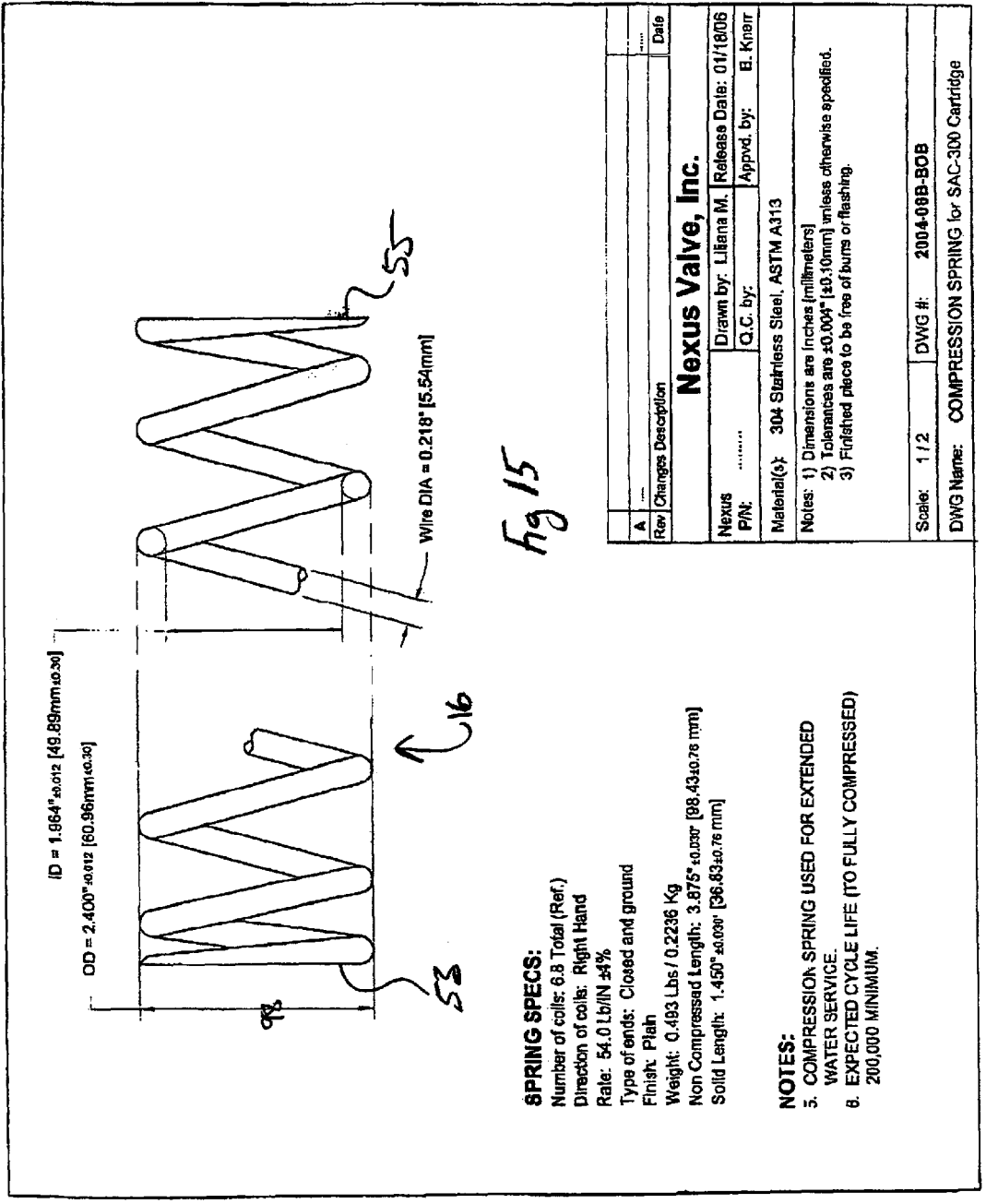

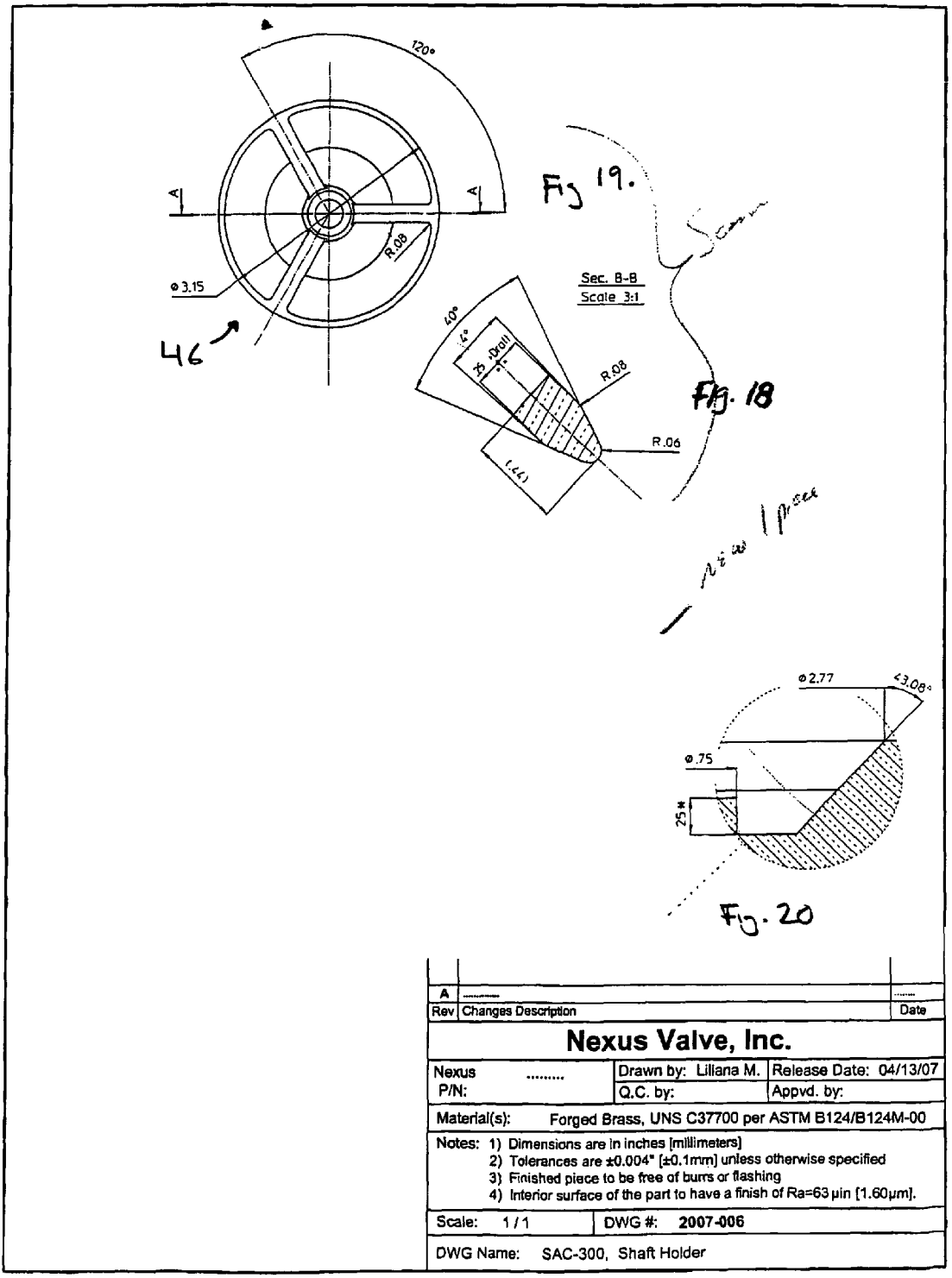

AUTOMATIC FLOW CONTROL REGULATOR VALVE

I. PRIORITY CLAIM

The present invention claims benefit to Dale Fazekas et al., U.S. Provisional Patent Application Ser. No. 60/928,252, entitled Automatic Flow Control Regulation Valve, that was filed on 8 May 2007; and Dale Fazekas et al., U.S. Provisional Patent Application Ser. No. 60/928,252, entitled Automatic Flow Control Regulation Valve, that was filed on 7 Oct. 2006 as Ser. No. 60/850,316.

II. TECHNICAL FIELD OF THE INVENTION

The present invention relates to valves for use in systems through which water flows, and more particularly relates to a flow control regulation valve that, while useful in any fluid flow system is especially useful in loop-type commercial and industrial fluid flow systems.

III. BACKGROUND OF THE INVENTION

Flow control valves have been used for a significant period of time in water flow and other fluid flow systems. One application in which the valve of the present invention and its competitors is useful is in heating and air conditioning systems wherein water is heated or chilled by a central heater/chiller, and then circulated in a closed loop throughout a network of rooms to heat or cool the network of rooms. For example, this device is well suited for use in a school or office building that has many rooms heated by the same recirculating water heating and/or cooling system.

A typical recirculating heating and/or cooling system comprises a central heat exchanger, a large pipe loop and a pump to pump water through the pipe loop. Within the loop are "branches" consisting of smaller side loop(s) through which a portion of the water can flow. Normally, a system includes a plurality of branches, as most buildings include a plurality of rooms. These branches might be sub-loops of the larger loop, wherein the sub-loops carry water to individual classrooms or offices. Within each classroom there is a remote heat exchanger that typically comprises a coil through which water flows. Air that passes over the heat exchanger is either cooled or heated, depending upon the temperature of the water flowing through the piping of the exchanger.

Either upstream or downstream from the pump there is a chiller or boiler containing a "central" heat exchanger where either heat is applied to the water flowing through the coil to heat the water, or a chilling substance such as Freon or cold water is applied to the water running through the pipe to cool the water. Once the water leaves the main heat exchanger area it is pumped to cause it to flow through the system. In each room within the building there will be a heat exchanger that is the equivalent or similar to a radiator one might have in a house. The radiator will often include an air handler mechanism to blow or pull air across the pipe so that the air can interact with the heat exchanger to be either heated or cooled thereby. The heated/cooled air is then moved by the air handler into the room for providing heat or coolness to the room.

One difficulty encountered in the operation of the above-described multi-branch closed loop systems involves the equitable distribution of heated or chilled water among the plurality of branches in the system. Achieving an equitable distribution of water greatly facilitates achieving an equitable distribution of heat or cool to the branches.

On a cold winter morning, it is likely that persons occupying all of the rooms in a multi-room building such as a school house, will wish to heat up the room for the day's activities. Rooms often need to be heated up in the morning, as the heat level is often decreased at night as an energy saving measure. Every teacher in every room will therefore usually turn on (or turn up) the heater when he/she first arrives in the room in the morning. In buildings with a closed loop water recirculation system, the heat is effectively turned up by a flow valve being opened to allow water which has recently been heated by the furnace to flow through each heat exchanger unit in the rooms where a teacher has turned the heat on or up.

If there are 30 cold rooms and all of the 30 flow control valves are opened at the same time (such as just prior to the start of the school day), the water in the closed loop system will move predominantly to the rooms nearest the central heating system (or pump) and less predominantly to the rooms furthest from the central heating system. A large amount of the hot water flowing through the system will tend to go to the closest room, while a significantly smaller amount will go to the furthest room. This leads to a situation where the rooms situated closest to the pump heat quickly to the desired temperature, while the more distant rooms that require the water to travel a further distance are relatively deprived of hot water, and therefore heat more slowly.

To overcome this problem and to create some flow equality between rooms, flow control valves are used. A flow control valve (which is often referred to as a flow limiting valve) controls the flow of water in a re-circulating system by limiting the amount of water that can flow through any of these branches at a particular time. For example, if rooms 101 through 130 all had a flow control valve, and if all of the teachers turned their valves on at the same time for all 30 rooms, a flow limiter would prevent the hot water from flowing predominately into room 101 (the closest room) because the flow of the hot water in room 101 would be limited by the flow control valve. By limiting flow, you would better balance the amount of hot water flowing into each of the 30 rooms in the hypothetical system described above.

When designing a system, one usually operates under the generally correct assumption that all the flow control valves in a re-circulation system will permit the same flow rate if the flow control valves are the same size and are configured similarly. If the flow control valves are properly chosen to have appropriate flow rates, based on both the water flow rate through the system, and the relative sizes of the rooms to be heated, the various rooms should all be able to become heated at approximately the same rate without regard to distance from the heat exchanger.

Prior art flow control valves exist. While the prior flow control valves do perform their function in a workmanlike manner, room for improvement exists. Room for improvement exists because there are certain limitations and problems that exist with existing flow control valves.

One of the problems with existing flow control valves is that they have a limited functional pressure range. If the pressure difference created by the fluid flow exceeds the pressure range supported by the valve, the valve will cease to function. Past their supported pressure range, the flow control valves effectively become fixed orifices. As a fixed orifice, a fully open valve allows an unlimited amount of water to flow through. A valve effectively becomes a fixed orifice because the metering disk of the valve is displaced at such a distance from its seat so that it fails to restrict the flow of water therethrough to any significant extent. When the displacement between the valve and its seat reaches a certain distance, the valve acts as a hollow pipe and loses its capacity to limit the flow of water therethrough to an appropriate flow level.

Another problem with currently existing flow control valves is that they require a certain amount of activation pressure to open the flow control valve to allow a fluid to flow therethrough. The need to provide this activation pressure forces the user to maintain a higher pressure within the system so that the valve will operate in its operating control range. Viewed another way, providing a valve that had a lower actuation pressure would permit a user to maintain a lower water pressure level in the system One of the problems with this high activation pressure of current flow control valves is that it adds unnecessary costs to the system, since a larger pump often with higher energy requirements is required in the system in order to overcome this activation pressure. A lower activation pressure for the valve is desirable because it allows for the same flow output with a smaller pump, and therefore permits the user to employ a smaller, less expensive pump.

If the purchaser of a typical HVAC system, such as a school or a local government, can provide efficient heating or cooling with a smaller pump, there are many advantages. First, a smaller pump will be less expensive to purchase. Second, using a smaller pump will often reduce power usage and energy costs, thereby providing significant operating savings. Finally, the smaller pump will often lead to improved maintainability.

Reducing the size of the valve will likewise save the purchaser money. Typically, valve sizes are based upon the amount of flow that is allowed to flow through them. For example, a valve that permits only a quarter of a gallon of liquid to flow through per minute is usually smaller and less expensive than a valve that is designed to permit 100 gallons per minute to flow through it.

As such, one object of the present invention is to provide valves that possess an expanded operating range when compared to similar sized valves. For example, if you need to provide a volume flow rate of 20 gallons/minute, you would typically need a size six valve. With applicant's design, a less expensive size five valve might be sufficient to provide the desired flow rate due to the increased effective operating range of the valves of the present invention. Because larger valves and piping are also more expensive, Applicant's invention allows the use of less expensive (smaller) valves and piping to obtain the same functionality as larger and hence more expensive valves and piping of the prior art.

The reduction of valve size and greater operating range are also important for reasons relating to availability. Typically, retail stores only stock a limited range of valve sizes. A more efficient, smaller valve that is capable of operating over a broader range of flow conditions will reduce the likelihood that the technician working on a commercial or industrial heating or cooling system will be unable to find an appropriate valve in his local dealer's inventory, thereby saving shipping costs for the customer, and providing for more efficient maintenance of the system with fewer delays. Increasing the likelihood that a suitable valve will be found within a dealer's inventory will reduce the instances where the valve will need to be specially ordered. Additionally, it would help to reduce inventory requirements for the builders and repair shops since the present valve can operate over a broader range, thus reducing the need to stock a greater range of valve sizes.

One object of the present invention is to provide a flow limiter valve that is more cost-effective and efficient than known competitive values currently available on the market.

Another object of the present invention is to provide a flow limiting valve that provides a low variance in its flow rate throughout the control range of the valve.

Yet another object of the present invention is to provide a valve with an improved control pressure range, including a lower activation pressure.

IV. SUMMARY OF THE INVENTION

In accordance with the present invention, a flow control valve comprises a body portion including a first end, a second end and an axially extending passageway. A metering valve is included that is axially moveable under the influence of fluid pressure from a rest position to a flow restricting position. In the flow restricting position, the metering valve can restrict the flow of fluid through the axially extending passageway. The metering valve includes an upstream portion and a downstream portion. The upstream portion has a flattened top spherical shape. A biasing device is provided that normally biases the metering valve in the rest position, and for provides resistance to movement of the metering valve to the flow restricting position.

Preferably, metering valve is axially movable in the axially extending passageway between the rest position where the metering valve is disposed in an enlarged diameter portion of the axially extending passageway, and the flow restricting position wherein the metering valves is disposed in the reduced diameter portion, The area in which fluid can flow through the reduced diameter portion decreases as the metering valve moves in a downstream direction in the reduced diameter portion. Additionally, the metering valve preferably includes a frusto-conical downstream portion.

In many respects, the flow control valve of the present invention functions similarly to current valves. The flow of water through a normally retracted valve is controlled by a compression spring. When an activation pressure has been reached in the system, the spring will compress, thereby moving a metering disk axially from a retracted position to an extended position in a flow path in the valve, to position the metering disk such that it can restrict or limit the flow of water through the valve.

There are several features of Applicant's invention that represent improvements over existing valves. Three primary features of the Applicant's invention include: (1) the use of a hollow shaft and three legged shaft holder apparatus; (2) the mushroom-shaped metering disc; and (3) the tapered interior passageway in which the metering disk can travel, and through which fluid can flow. These three features each bring particular advantages to the Applicant's valve.

The inventive hollow shaft provides an important function of allowing more water to flow through the valve, which has the beneficial effect of reducing the activation pressure required to open the valve. This lower activation pressure is especially important where a low pressure differential exists, as the increased water flow made possible by the hollow shaft enables the activation pressure of the valve to be reached more easily, thereby allowing the valve to enter its control range at a much lower pressure. Through the valve's ability to reach its control range at lower pressures, a smaller pump can be used in the system, thus reducing costs of the pump required in the fluid flow system.

The three legged shaft holder feature has the advantage of reducing the number of parts required to make up the valve, and also allows better flow through the valve. The tripod shaft holder has a much smaller surface area exposed to fluid flow than known, existing mechanisms, which often employed a "table and legs" type arrangement. The tripod shaft holder also allows for a greater quantity of flow through the valve when compared to the known prior art.

The mushroom-shaped metering disk feature represents a great improvement from the metering disk typically used in flow control valves. The mushroom metering disk is named for its mushroom head-like shape. The valve portion on the inlet end, where the flow enters, has a flattened spherical shape. On the outlet end, the mushroom metering valve has an inverted frusto-conical shape. The mushroom valve controls the constriction of the flow within the orifice, that is technically called the venacontracta. The flow area of the mushroom metering disk is reduced to the dimensional restraints of the flow.

The effective surface of the mushroom shaped metering disk changes, depending on the flow pressure through the system. At low pressures, the mushroom metering disk has a smaller surface area, which contributes to the low activation pressure of applicant's valve. At high pressures, the effective surface area of the mushroom metering valve is the entire surface area of the spherical portion. The surface area of the spherical portion is much greater than the flat, cylindrical surface used by known prior art valves. Because flow control is dependant on surface area, the mushroom metering disk contributes to a larger effective range for the valve.

When a known prior art metering disc is used, the orifice through which fluid flows is sharp edged, which causes the water to move laterally and downward laterally toward to the hole and downwardly into the hole. The water stream that is formed downstream of the valve when the prior art valve is employed tends to be much narrower than the diameter of a pipe to which it is flowing. This stream constriction results from having water entering into the down stream pipe from a side angle. The flow profile of a liquid past a prior art cylindrical metering disk will tend towards turbulent flow. When you round the inlet portion of the metering disk of the present invention, fluid flows in more gently around the metering disk, allowing a much more laminar flow pattern into and through the pipe downstream of the valve with the present invention.

Finally, the mushroom-shaped metering disk allows a much more uniform and forgiving flow pattern. The prior art cylindrical metering disk is much more susceptible to slight movements, increasing the flow rate variance. The lowest known published flow rate variance is currently +/−5%. With the mushroom metering disk, flow rate variances of around +/−2% can be achieved regularly across the control range. This enhanced uniformity is especially noticeable around the initial pressure drop.

In addition to the advantages discussed above, Applicant's valve also represents an improvement over known prior art in other ways.

Another feature of the Applicant's valve is its use of an improved spring when compared to the known prior art. Although the spring employed by the Applicant uses the same wire gage as known prior art springs, it has longer coil spacing to help increase the width of the valve's control range band. This provides for more spring travel than known prior art springs. The coil spacing helps allow a smaller force to provide for activation of the system, and the increased travel helps extend the control range at high pressures.

Additionally, the Applicant's valve employs a spring holder that essentially is a ring having several support legs and preferably three support legs. This differs from known prior art spring supports that were essentially closed discs, similar to large cans. Such closed discs allowed less water to flow through the valve than the Applicant's more open ring arrangement, since the spaces between the legs of the support legs allow water flow through the ring, whereas a closed disc having no spaces or apertures would not allow such flow.

These and other features will become apparent from a review of the detailed description and the drawings that represent the best mode of practicing the invention perceived presently by the Applicant.

V. BRIEF DESCRIPTION OF DRAWINGS

FIG. 3 is a side, sectional view of the interior components of the flow control valve.

FIG. 4 is a top view of the shaft holder.

FIG. 5 is a side, sectional view of the shaft holder, taken along lines 5-5 of FIG. 4.

FIG. 6 is a sectional view of the shaft holder taken along lines 6-6 of FIG. 4.

FIG. 7 is a side view of the shaft holder similar to the view of FIG. 5, but showing the exterior of the shaft holder.

FIG. 8 is a side view partly in section of the hollow shaft.

FIG. 9 is a magnification partial side, sectional view of the upstream (inflow) end portion of the hollow shaft.

FIG. 10 is an end view of the hollow shaft.

FIG. 11 is a side view of the mushroom-shaped metering disk.

FIG. 12 is a side sectional view of the mushroom-shaped metering disk, taken along lines 12-12 of FIG. 14.

FIG. 13 is a side view of a portion of the mushroom-shaped metering disk showing the intersection of the mushroom-shaped upstream surface and the frusto-conical shaped downstream surface.

FIG. 14 is a downstream end view of the mushroom-shaped metering disk of the present invention.

FIG. 15 is a side view partly broken away, of the compression spring.

FIG. 18 is a sectional view taken along lines 18-18 of FIG. 17.

FIG. 19 is an end view of the shaft holder of the alternate embodiment of FIG. 17; and FIG. 20 is a detailed view of the portion of the shaft holder shown in encircled area 20 in FIG. 17.

VI. DETAILED DESCRIPTION

Figure 1:
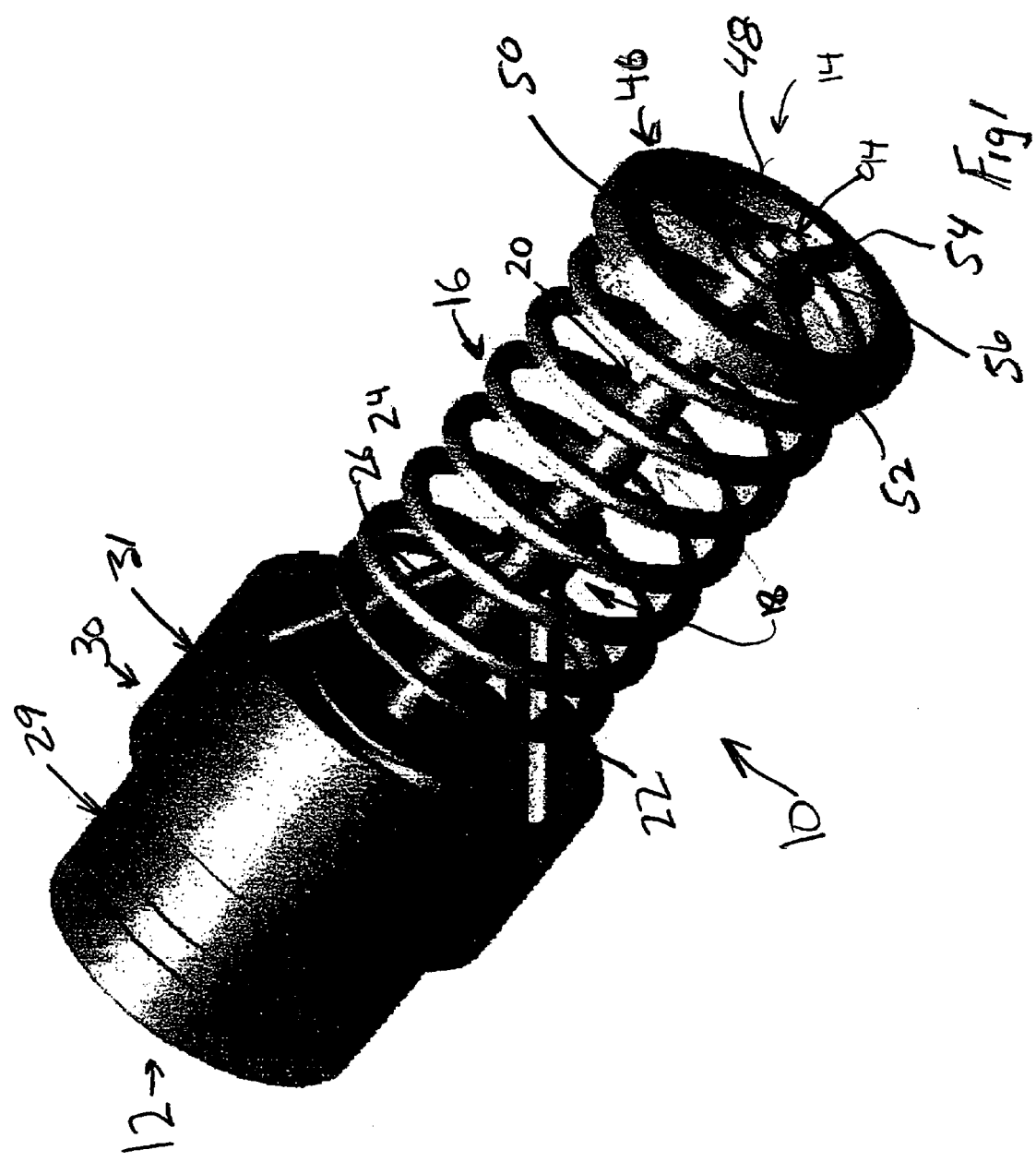
FIG. 1 is a perspective view of the flow control valve of the present invention.
Figure 2:
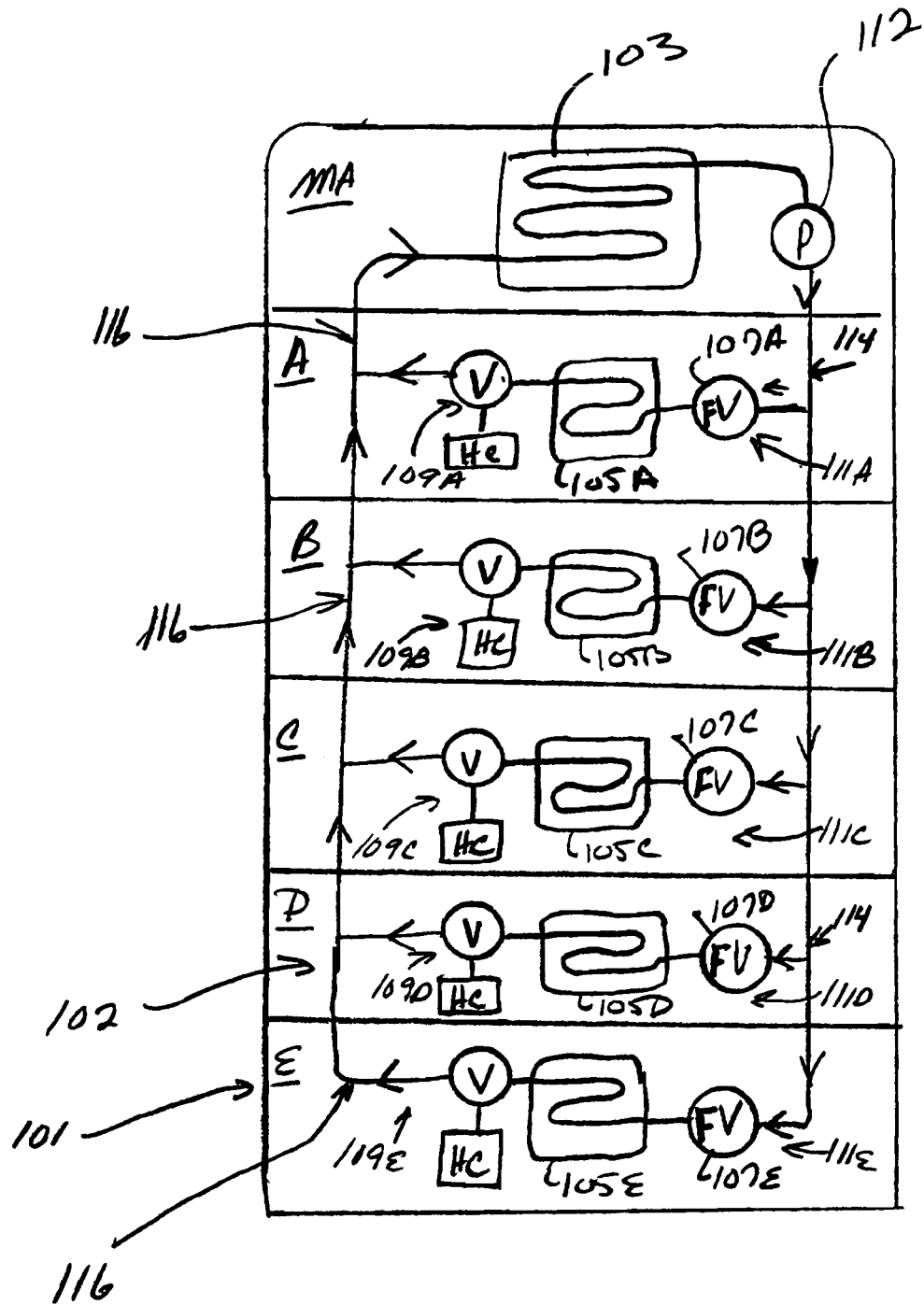
FIG. 2 is a schematic view of a typical closed loop recirculating liquid type commercial heating or cooling system.

A valve 10 of the present invention is shown in FIG. 1, that particularly well suited for use in a closed loop, recirculating heating/cooling system 102 shown in FIG. 2. The water circulation system 102 is shown being used for heating and/or cooling a building 101 having six rooms including a mechanical room, MA, and five other rooms A, B, C, D and E which, in a school might comprise five class rooms A-E. The water circulation system 102 is shown as being a closed loop, fluid recirculating system wherein the fluid (usually water) that flows through the system is either heated to heat the rooms A-E of the building, or else chilled to cool the rooms A-E of the building.

The mechanical room MA includes a central heat exchanger 103 that is usually part of an air conditioner or furnace unit, and a pump 112 for pumping water through the water circulation system 102. A branch 111A, 111B, 111C, 111D, and 111E, of the water circulation system 102 extends into each of the rooms A-E of the building.

Each branch 111A-E (and hence each room A-E) includes a heat exchanger 105A, 105B, 105C, 105D, and 105E and a flow control valve 107A, 107B, 107C, 107D and 107E of the present invention for controlling the flow of water in the particular branch 111A-111E of the water circulation system 102 that resides in the particular room A-E. The heat exchangers 105A-105E (often referred to as radiators) may assume a variety of shapes, sizes and configurations. A user actuable heat control switch HE and valve V arrangement 109A, 109B, 109C, 109D and 109E are provided in each room for permitting the person residing in the room to control the temperature in the room by using the valve to control the flow of water through the branch 111A-111E. Water or other fluid is pumped through the system 102 and is capable of flowing into each branch 111A-111E thereof.

The pump 112 pumps water into the outflow line 114 from which it can flow into one or more of the branches 111A-111E. A return line 116 is provided for collecting the water that has flowed through the branches 111A-111E, and for directing the collected water back to the central heat exchanger 103. The action of the pump 112 causes the water in the heat exchanger 103 to be drawn into the pump 112, that pumps the water in a closed circuit into the outflow line 114 that circulates the water back to the branches 111A-111E. The flow control valves 107A-107E serve to increase uniformity of water flow among the rooms A-E, so that the room A nearest to the heater/chiller 103 and pump 112, and room E which is furthest from the heater/chiller 103 and pump 112 each receive an equitable distribution of the water flowing through the system 102, and hence an equitable distribution of heat or cool from the system 102.

Figure 16:
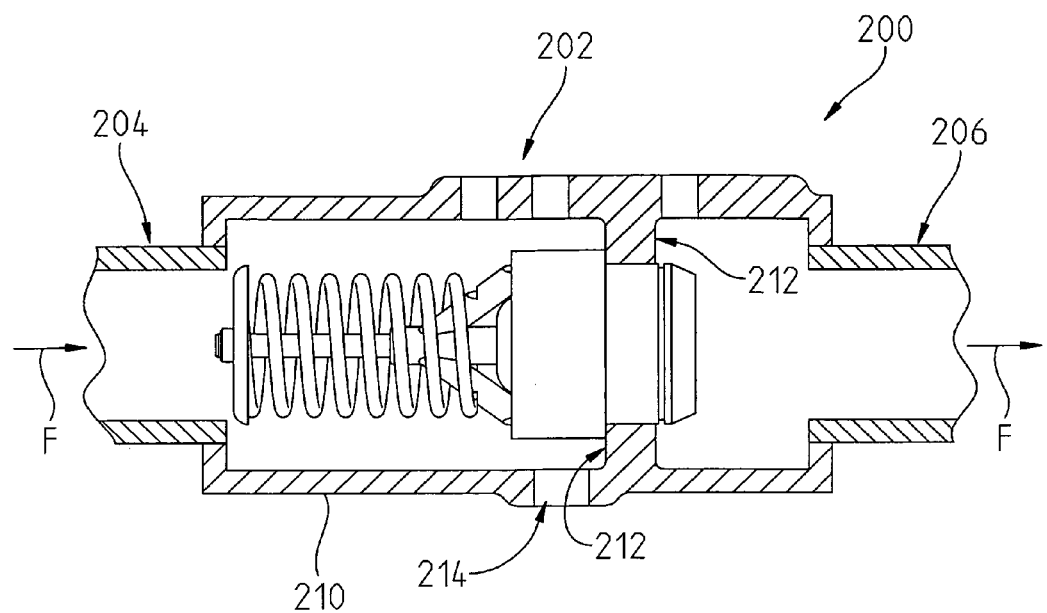
FIG. 16 is a side, sectional view of the valve of the present invention installed within a valve casing of a fluid system.
Figure 16A:
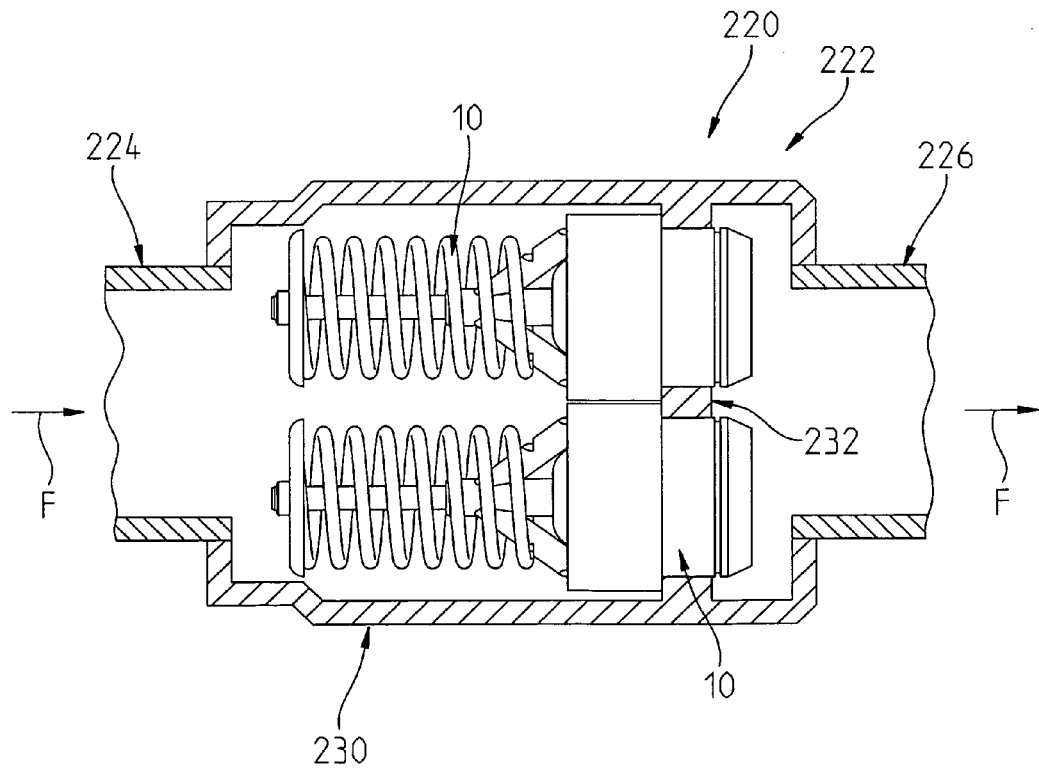
FIG. 16A is a side sectional view of a pair of valves of the present invention installed within a multi-valve containing valve casing of the present invention.

Turning now to FIGS. 16 and 16A, flow regulator valves 10 of the present invention are shown being installed in a fluid system 200 (FIG. 16), 202 (FIG. 16A). The fluid system 200 of FIG. 16 includes a valve 10 containing casing 202 that is disposed between an upstream pipe 204 and a downstream pipe 206, and in which water flows in a direction indicated generally by arrows F. The casing 202 includes a usually enlarged diameter, axially extending cylindrical wall 210 that includes a radially extending shelf 212 therein. The shelf typically includes apertures therein through which a flow control valve 10 of the present invention can pass, and to which hardware can be attached for securing the valve in the aperture and to the shelf 212. One of more cylindrical ports 214 can also be formed in the side of the casing. In FIG. 16A a similar fluid system 220 is shown wherein the casing 222 that is employed is designed for holding multiple flow control valves 10, here shown as two valves 10. Multiple valve containing casings are typically used with larger diameter pipes. For example, a four valve containing casing may be used with a 24 inch (61 cm) diameter pipe containing fluid system. Casing 222 is disposed between an upstream pipe 224 and a downstream pipe 226, and in which water flows in a direction indicated generally by arrows F. The casing 222 includes a usually enlarged diameter, axially extending cylindrical wall 230 that includes a radially extending shelf 232 therein. The shelf 232 includes apertures therein through which the flow control valves 10 of the present invention can pass, and to which hardware can be attached for securing the valves 10 in the aperture and to the shelf 232. One of more cylindrical ports (not shown) can also be formed in the side of the casing.

The flow control valve 10 is shown in the figures as having a generally cylindrical shape. The valve has an outlet end 12 and an inlet end 14. The ends are connected by a spring assembly 16 and a hollow body 30. The hollow body 30 is generally cylindrical in configuration, and includes a relatively reduced diameter portion 29 adjacent to the downstream or outlet end 12, and a relatively enlarged diameter portion 31 positioned upstream of the reduced diameter portion 29. As shown in FIG. 3, the relatively downstream reduced diameter portion 29 has a reduced inner (internal) diameter, when compared to the relatively greater internal diameter of relatively enlarged diameter portion 31, that is disposed adjacent to and upstream of the reduced diameter portion 29.

Figure 17:
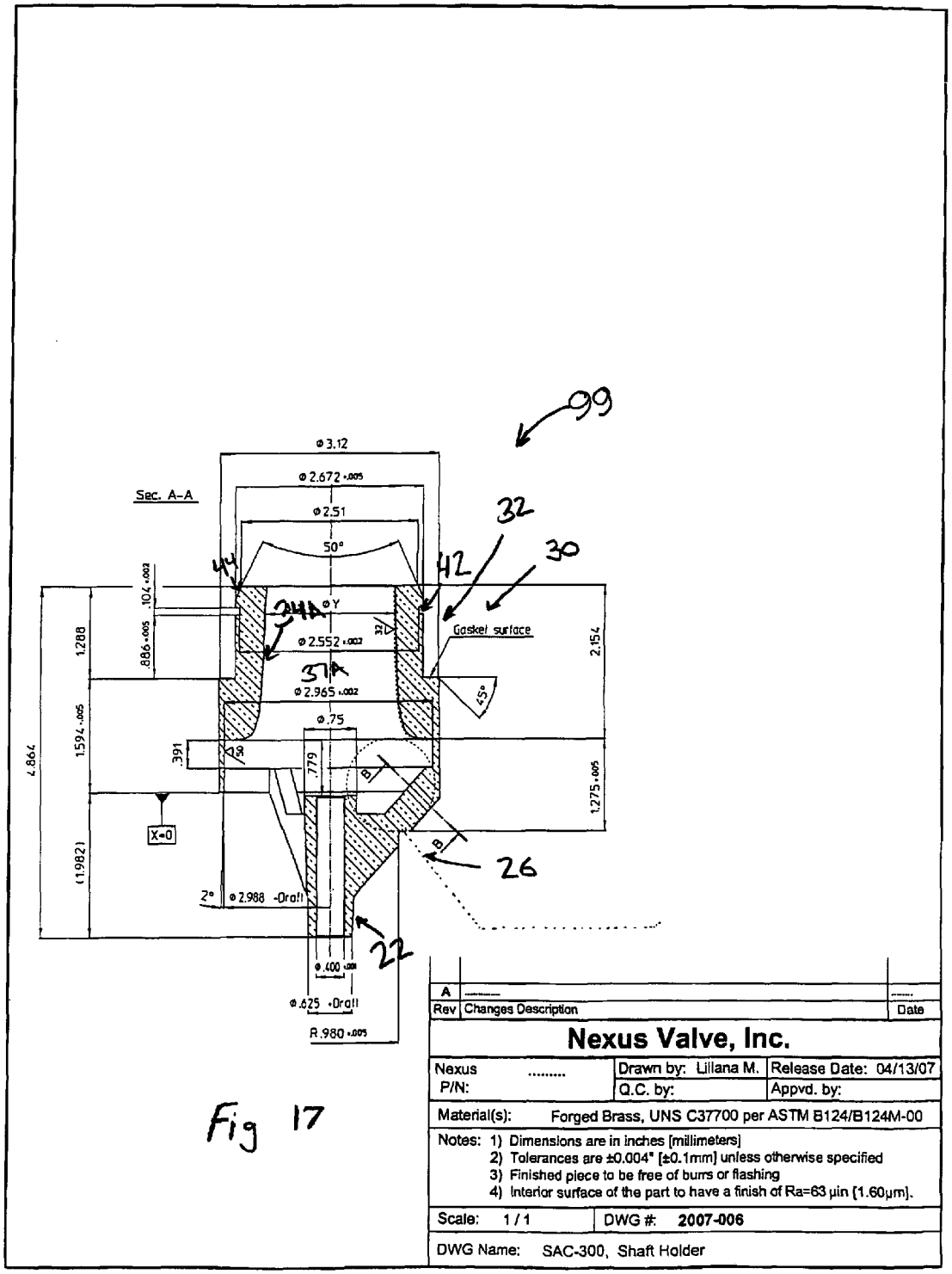
FIG. 17 is a sectional interior view of an alternate embodiment, one-piece flow control valve casing.

The hollow body 30 is preferably a one piece cast design, such as the one piece cast body 30A shown in FIG. 17. The one piece design increases efficiency of production because multiple components do not have to be made and then assembled together. Additionally, a one piece valve body 30A (FIG. 17) enhances the performance of the flow control valve 10. The legs 26 of the shaft holder 22 are attached in casting to the body 30A and all components thereof. A one piece valve body 30A is more efficient because it helps to make the device smoother to flow by eliminating or reducing the relatively rougher areas where connections take place. As such, a unitarily formed valve body 30A presents a smoother surface to the water flow, that is likely to result in a smoother, less turbulent flow of water through the valve body 30A.

Because the legs 24, 26, 28 are unitarily formed with the body 30A, the flow control valve 10 can be made to be more resistant to wear. The connections between the leg 24, 26, 28 and body 30A would normally be a weak point of the device, that is subject to degradation due to the constant flow of water at the connection of the legs 24, 26, 28 to the body 30. Water will degrade the material used over time, especially in the connection area. A one piece body design increases the life span of the valve, by providing a stronger, less degradable juncture of the legs 24, 26, 28 and the body 30.

Turning back to FIGS. 1 and 3, the flow of fluid through the hollow body 30 of the flow control valve 10 is controlled by a high travel spring 16, through the spring's 16 ability to influence the position and mount of the valve head 50. The spring is supported by a shaft holder assembly 18. The shaft holder assembly 18 features a hollow, cylindrical, axially extending shaft 20 and a shaft holder 22, whose primary component is a cylindrical, axially extending sleeve 22 that defines an axially extending passageway for interiorly receiving axially moveable shaft 20. The axis of the shaft holder 22 is disposed co-linearly with the axis of the shaft 20.

The shaft holder 22 has three legs 24, 26, 28 extending radially outwardly of the shaft holder 22. The three legs 22, 24, 26 extend at about a 45° angle to the axis of the shaft 20 and shaft holder 22, so that the legs extend outwardly out in a downstream direction, much like the legs of a tri-pod. Each of the legs 22, 24, 26 includes a relatively upstream disposed proximal end 19 that is attached to the shaft holder 22, and a relatively downstream disposed distal end 21 that is disposed adjacent to the enlarged diameter portion 31 of the valve body 30. The shaft holder 22 includes an axially extending passageway that is sized and positioned for interiorly slidably receiving the hollow shaft 20. The legs 24, 26, 28 of the shaft holder 22 serve as the downstream seat for the downstream end of the spring. The distal portions 21 of legs 24, 26, 28 also attach the shaft holder 22 to the valve body, and fixedly position it appropriately.

An interior sectional view of the valve 10 is shown in FIG. 3. The radially inwardly facing interior surface includes a relatively enlarged diameter interior cylindrical portion 33A that is disposed upstream of a progressively radially inwardly contoured, relatively reduced diameter interior portion 34A. The reduced diameter portion 34A is contoured so that its diameter decreases progressively as one move in a downstream direction as indicated by arrow "F".

The cylindrical portion 33A and the reduced diameter portion 34A are designed to maximize flow throughout the valve 10 by employing a shape that promotes a smoother, less turbulent, and better channeled flow of water through the interior passageway 37A of the valve body 30. It will be appreciate that the progressively radially inwardly contoured surface of the reduced diameter portion causes the upstream end of the radial diameter portion 34A to have a greater inner diameter than the downstream end of the reduced diameter portion 34A.

The exterior of the hollow body 30 contains a perimetral groove 42 disposed close to the downstream end in which an o-ring can reside, and a tapered distal or downstream end 44. The groove 42 and the tapered end 44 along with the threaded radially outwardly facing surface 45A exist to allow the valve to be easily affixed to any fluid flow system with the o-ring helping to reduce the likelihood of leaks at the connection. The upstream end 45 is sized for receiving the metering disk 50, that is the primary mechanism for controlling flow through the valve 10.

The metering disk 50 is axially movable into and out of engagement with its upstream seat, to thereby vary the axial position of the metering valve in the interior 37A of the valve body 30. Through the interaction of the variable position in the interior, and the varying diameter of the enlarged diameter portion 33A and reduced diameter portion 34A, the effective size of the opening through which water can flow in the valve 10 around the metering disk 50 is varied. This variation in opening size enables the flow rate of water through the opening to be varied, thus giving the valve 10 its flow limiting ability and characteristics.

The spring 16 extends from the inlet end 14 of the valve 10 to the hollow body 30. The spring 16, which is ground flat to be planar on both ends 53, 55 (FIG. 15), is supported on the upstream inlet end 14 by the shaft 18, and the spring holding restraining ring 46. The shaft 18 and the restraining ring 46 includes a central aperture which receives the inlet end of the shaft. The axial position of the restraining ring 46 is fixed by a snap ring 94.

Alternately, the central aperture of the restraining ring 46 can be internally threaded for threadedly receiving a threaded exterior surface of the axially extending hollow shaft 18. The restraining ring 46 has a shape that resembles a three-legged peace sign, with an outer ring portion 48 and three legs including first leg 51, second leg 52 and third leg 54. Apertures exist in the spaces defined by and not occupied by the outer ring portion 48 and legs 51, 52, 54. The legs 51, 52, 54 connect the outer ring portion 48 with an inner ring portion 56. The inner ring portion 56 may be sized and configured for receiving the snap ring 94 and may include a central aperture for receiving the shaft 18.

The outer ring portion 48 contains an axially and distally extending flange 55 that creates a sidewall on the spring receiving side of ring 48, that helps to maintain the upstream end of the spring 16 on the ring, by helping to prevent radial movement of the spring 16 end on the ring 46. The generally open nature of the restraining ring 46 is another mechanism by which the total fluid flow through the valve 10 is maximized.

The flow control valve 10 is preferably manufactured precisely, with tolerances being specified to be within about 0.25 millimeters or less. The finished components of the valve 10 should be free of any imperfections, such as burrs of flashing. Imperfections on the metal used in the valve 10 will impede flow locally, causing a more variable and turbulent flow. Potentially, a very large number of local imperfections could negate the performance gains obtained by the design.

As best shown in FIGS. 4-7, the legs 24, 26, 28 of the shaft holder 22 are preferably made out of a brass material that is capable of being formed economically. Alternately, the valve 10 may be made out of stainless steel. As with many valves, brass is used because of its resistance to rusting. The legs 24, 26, 28, along with the all components of the valve 10, should be highly corrosion resistant due to the volume of liquid that flows through the valve 10 during its lifetime, while being economical enough to be cost-competitive when used in a typical commercial heating or cooling system.

The legs 24, 26, 28 of the shaft holder 22 are spaced apart equidistantly at equal 120 degree angles as shown in FIG. 4. Additionally, each leg 24, 26, 28 is equally angled in a downstream direction, so that the distal end 21 of each leg is disposed relatively downstream of the proximal end 19. Preferably, the legs are angled at about a 45° angle to the axis of the shaft holder 22.

The shaft holder assembly 18 is best seen in FIGS. 4-7. FIG. 5 shows a sectional view of the leg member 24 from the center point of the shaft holder assembly 22. This preferred cross-sectional profile of each leg is a teardrop shape (FIG. 6) with a rounded upper portion 62 and a pointed edged lower portion 64. The teardrop cross-sectional shape of the legs 24, 26, 28 enhances the flow properties of the valve, and reduces turbulent flow.

The shaft holder 22 is preferably created with a one piece casting. Each leg 24, 26, 28 also has a notch 66 at the midpoint of the upper outer surface 64 of each leg. The notch 66 serves as a seat for spring 16, and serves to hold the downstream end of the spring 16 in place.

FIGS. 8-11 show the hollow shaft 20, which is generally cylindrically shaped. The shaft 20 contains an inlet 74 for allowing fluid flow into the hollow interior passageway 70; an outlet aperture 72 through which water can exit the axially extending interior passageway 70; and circumferential grooves 76, 78 for receiving snap rings that are employed to limit the axial movement of the restraining ring 46 and the metering disk 50. The grooves 76, 78 are designed to hold the snap rings 94. The shaft 18 also has a 30 degree tapered end portion 82 adjacent to each end of the shaft 20. Preferredly, shaft 20 is formed from standard sized tubing, such as tubing having an outer diameter of 10 mm and a wall thickness of 1.5 mm, to enhance the ready availability of raw stock from which to form the hollow shaft 20.

The metering disk 50 is best shown in FIGS. 11-14. The disk 50 contains an axially extending central passageway 84 that is sized to interiorly receive the support shaft 20, that passes therethrough. At the downstream end 85 of the central passageway 84, there exists a taper 86 that allows the metering disk 50 to be attached to the support member 18 via a snap ring (not shown). Alternately, the passageway 84 can comprise an internally threaded passageway whose threads are sized and configured for threadedly engaging a set of external male threads formed on the downstream end portion of the shaft 20.

The metering disk 50 includes an upstream portion 80 having a rounded edge 81 portion and a flattened central top portion 83; and a frusto-conically-shaped downstream portion 82. The frusto-conical downstream portion 82 includes an angled side portion 90, which is preferably angled at about 45° to the axis of aperture 84; and a radially extending, axially downstream facing flattened portion 92. When taken in profile, the upstream portion 80 and the frusto-conical downstream portion 87 combine to resemble something similar to a mushroom head. Both portions 80, 82 of the metering disk 50 extend radially outwardly from the shaft member 20 that passes through the central passageway 84 of the metering disk 50.

The downstream portion of the metering disk 50 has a 30 degree inward facing taper 86 on the aperture 84. This taper 86 allows the snap ring 58 to attach with both the metering disk and the support member 20.

The purpose of the metering disk 50 is to provide pressure activated control for the flow of fluid through the closed system 102. The flattened top, spherical shape of the upstream portion 80 allows for a variable flow rate based upon pressure, and also, in conjunction with the frusto-conical downstream portion 87, promotes a smooth, non-turbulent flow of water around the metering disk 50. Preferably, the metering disk 50 will be able to be machined at a minimal cost from a corrosion resistant material (e.g. brass, stainless steel or plastic) that will provide long life under normal use conditions.

The other upstream end of the shaft holder member 20 is affixed to the spring 16 by a restraining ring 44. The restraining ring 44 is designed to minimize the area of metal exposed to fluid flow, and therefore allow a higher volume flow rate. The restraining ring 44 has three radially extending legs 51, 52, 54 that are generally separated by 120°. The legs 51, 52, 54 are extend radially inwardly from an outer ring portion 48 to a concentric inner ring portion 56. The inner ring portion 56 is preferably attached to the shaft holder with a snap ring 94.

The snap rings 94 are used to attach the valve 10 components because of ease of attachment and desirability. The snap ring 94 is highly useful with a completely hollow valve because it can be designed to allow fluid flow. Alternately, the distal end of the axially extending hollow shaft 20 can include an exteriorly threaded surface sized and shaped for receiving female threads formed on the axially extending central passageway of the inner ring 56 of upstream spring seat ring 46.

The spring 16 is preferably a stainless steel compression spring. The spring 16 is selected to permit more axial travel than is typically present in springs (not shown) employed in prior art valves. The ideal spring 16 has 6.8 coils with a slightly larger wire diameter 98 (FIG. 15) than is typically used.

The valve body 30 is a standard stainless steel or brass valve casing. The body 30 has standardized dimensions because of the modular and uniform uses of the pipes and fitting in which the valve 30 will be used. In this regard, the exterior length and diameter dimensions of the body 30 and valve 10 are governed largely by the fitting and pipe dimensions of the conduit systems in which the valve is used. The valve 10 is required to be placed in a wide variety of existing heating and cooling systems, and mates with a wide variety of components. The body 30 and many of its components and fittings are preferably made to fit standard sized water flow components.

Stainless steel or brass are the desired materials for most components of the valve 10. Stainless steel and brass are relatively reasonably priced to purchase and manufacture, allowing the valve 10 to be produced at an acceptable cost. Additionally, stainless steel and brass have the corrosion resistance properties necessary to provide a long life for the flow control valve 10.

The distal portion 34A of the interior wall valve body 30 preferably has a slight taper that tapers radially inwardly progressively as the wall 34A proceeds in a downstream direction. This tapered wall 34A can be designed to provide a different flow rate depending on the application. A large taper would more significantly restrict the amount of water, and limit the flow rate as the meter disk moved in an axially downstream direction, while a smaller taper would allow a relatively greater flow rate through the valve 10.

The alternate embodiment shown in FIGS. 17-19 is generally similar to the embodiment shown in FIGS. 1-16, with the exception that the embodiment 99 shown in FIGS. 17-19 employs a one piece, cast body, rather than the two-piece, cast body that may be shown in one or more of the other figures.

Another difference with embodiment 99 is the cross-sectional shape of the support legs, such as support leg 24A shown in FIG. 18. If one compares the cross-sectional shape of the leg 24A of FIG. 18, to the cross-sectional shape of the leg 24 shown in FIG. 6, one will notice that the cross-sectional shape of the leg 24 of FIG. 6 is somewhat tear-drop shaped, whereas leg 24A of FIG. 18 has a relatively upstream end 64 that is more rounded and has a relatively greater radius of curvature, and a downstream end 62A that is generally planar.

Additionally, as shown in FIG. 20, the niche 66A into which the spring 16 seats on the leg 24 is shaped somewhat different.

In operation, the device performs as follows.

Turning now to FIG. 3, the valve 10 is inserted within a pipe for fitting at the position 107A-107E is the flow control valve is shown within the branches 111A-111E in the closed loop circulation system of the building (FIG. 2). The valve is inserted so that the upstream end 14 is disposed relatively upstream of the downstream end 12 of the valve 10. When so disposed, water flows in a direction shown generally by arrows F, from the upstream end 14, the downstream end 12 of the valve 10.

The pressure exerted by the water on both the retaining ring 46, and upstream surface 80 of meter disk 50, causes the shaft 20 and metering disk 50 to move axially, in a downstream direction, as indicated generally by arrow F. In order to move in direction F, the flow of the water against the ring 46 and metering disk 50 must be great enough to exert enough pressure on the ring 46 and metering disk 50 to overcome the counter-veiling bias force imposed by the compression spring 16, that is designed to normally bias the shaft 20 to move in an upstream direction, as indicated generally by arrow US of FIG. 3.

It will be appreciated that the volume of flow that is allowed to pass through the interior 37A of the valve body 30 will be determined largely by the area of the interior of the valve body 30, which of course, is related to the inner diameter of the interior 37A of the valve body 30. More particularly, the amount of flow will be governed by the difference between the area provided by the internal diameter of the valve body 30, and the outer diameter of the metering disk 50, as the metering disk 50 forces water to flow around the metering disk 50 so that the water flows between the outer edge of the metering disk 50 and the interior walls 33A, 34A of the valve body 30.

As discussed above, the interior walls of the valve body include a relatively enlarged diameter portion 33A, and a reduced diameter portion 34A. Within the enlarged diameter portion 33A, the walls are generally cylindrical. As such, the area in which flow can occur within the interior of the valve will not change much, as the metering disk 50 moves from its fully retracted position, as shown in FIG. 3 to a partially extended position wherein the metering disk 50 is axially positioned at the same axial position as a portion of the enlarged diameter portion 33A. However, that changes as the metering disk 50 moves into the reduced diameter portion 34A. In the reduced diameter portion, the inner diameter of the reduced diameter portion 34A progressively decreases as one moves in a downstream direction. Hence, as the metering disk 50 moves in a downstream direction under the influence of a significant enough flow to cause the metering disk 50 to move that far, the open area of the interior of the valve in which water can flow past the metering disk will decrease, since the distance between the radially outward surface of the metering disk 50 and the surface of the reduced diameter portion 34A decreases, and hence the area of the water flow path decreases.

In essence, the further in a downstream direction that the metering disk 50 moves, the more the metering disk will serve to restrict the flow of fluid through the valve, and hence, restrict the flow of fluid that can flow through any one branch, (e.g. 111A, 111B, etc.). In this manner, the valve 30 can restrict the flow of fluid into a branch, and thereby serves its function as a flow limiter.

Although the invention has been explained with reference to certain preferred embodiments, it will be appreciated that the invention is not limited by these preferred embodiments, and that other equivalents will become apparent skilled in the art, wherein the invention shall be limited only by the prior art and the claims set forth below.

What is claimed:

1. A flow control valve comprising
a body portion including a first end, a second end and an interior surface defining an axially extending passageway having a minimum diameter portion,
a metering valve including an upstream portion, a downstream portion and a side portion between the upstream portion and the downstream portion, the side portion including a maximum diameter portion smaller than the minimum diameter portion of the axial passageway to define a fluid flow space through which fluid can flow between the maximum diameter portion of the metering valve and the minimum diameter portion of the axially extending passageway, the upstream portion having a flattened top spherical shape, the metering valve being axially moveable within the axially extending passageway under the influence of fluid pressure from a rest position wherein flow of fluid through the valve is relatively unrestricted, to a flow restricting position wherein the metering valve can relatively restrict, while still permitting the flow of fluid through the fluid flow space of the axially extending passageway, and
a biasing device for normally biasing the metering valve in the rest position, and for providing resistance to movement of the metering valve to the flow restricting position.

2. The flow valve of claim 1 wherein the first end is an upstream end, and the second end is a downstream end when the valve is installed in a fluid system, the body portion including an exterior surface and an interior surface, and wherein the flattened top spherical shape provides a fluid path over the upstream portion and around the side portion of the metering valve.

3. The flow control valve of claim 2 wherein the axially extending passageway has a diameter of varying size, and wherein the minimum diameter portion is disposed relatively closer to the downstream end, and a wherein the axially extending passageway includes a relatively enlarged diameter portion disposed relatively closer to the upstream end.

4. The flow control valve of claim 3 wherein the metering valve is axially movable in the axially extending passageway of the body between the rest position where the metering valve is disposed in the relatively enlarged diameter portion, and the flow restricting position wherein the metering valve is disposed in the minimum diameter portion, wherein the area in which fluid can flow through the minimum diameter portion decreases as the metering valve moves in a downstream direction in the minimum diameter portion, but never decreases to the point where a useable flow of water is not capable of flowing through the fluid flow space.

5. The flow control valve of claim 1 wherein the metering valve includes an exteriorly disposed frusto-conical downstream portion, and wherein the metering valve permits the flow of fluid over and around the metering valve when the metering valve is in the flow restricting position, in a position wherein the maximum diameter portion of the metering valve is aligned with the minimum diameter portion of the axially extending passageway.

6. The flow control valve of claim 1, further comprising an axially movable shaft member for functionally coupling the metering valve to the biasing device, the shaft member having a first end coupled to the biasing device and a second end coupled to the metering valve, the shaft and biasing device being configured so that the biasing device is relatively more compressed when the metering valve is in the flow resisting position than when in the rest position.

7. The flow control valve of claim 6 wherein the biasing device includes a spring and a biasing device seat for serving as an upstream seat for the spring, the spring being coupled to the first end of the shaft member; the shaft member includes a long axis, the spring includes a downstream end, wherein at least two legs extend between the shaft member and the body portion, the at least two legs being disposed at an oblique angle to the long axis of the shaft member, the at least two legs serving as a downstream seat for the spring.

8. The flow control valve of claim 1 wherein the flow control valve includes an axially movable shaft member for functionally coupling the metering valve to the biasing device, the axially movable shaft member including an upstream end, a downstream end, and an axially extending interior passageway extending between the upstream end and the downstream end, through which fluid can flow.

9. A flow control valve comprising
a body portion including a first end, a second end and an interior surface defining an axially extending passageway having a minimum diameter portion,
a metering valve including an upstream portion, a downstream portion and a side portion between the upstream portion and the downstream portion, the side portion including a maximum diameter portion smaller than the minimum diameter portion of the axial passageway to define a fluid flow space though which fluid can flow between the maximum diameter portion of the metering valve and the minimum diameter portion of the axially extending passageway, the upstream portion having a flattened top spherical shape, the metering valve being axially moveable within the axially extending passageway under the influence of fluid pressure from a rest position wherein flow of fluid through the valve is relatively unrestricted, to a flow restricting position wherein the metering valve can relatively restrict, while still permitting the flow of fluid through the fluid flow space of the axially extending passageway, and
a biasing device for normally biasing the metering valve in the rest position, and for providing resistance to movement of the metering valve to the flow restricting position, wherein the biasing device seat includes a central ring having a central aperture for receiving the first end of the shaft member, a perimetral ring member for receiving an upstream end of the spring, and at least two legs extending between the central ring and the perime- 10. A flow control valve comprising
a body portion including a first end, a second end and an interior surface definig an axially extending passageway having a minimum diameter portion,
a metering valve including an upstream portion, a downstream portion and a side portion between the upstream portion and the downstream portion, the side portion including a maximum diameter portion smaller than the minimum diameter portion of the axial passageway to define a fluid flow space though which fluid can flow between the maximum diameter portion of the metering valve and the minimum diameter portion of the axially extending passageway, the upstream portion having a flattened top spherical shape, the metering valve being axially moveable within the axially extending passageway under the influence of fluid pressure from a rest position wherein flow of fluid through the valve is relatively unrestricted, to a flow restricting position wherein the metering valve can relatively restrict, while still permitting the flow of fluid through the fluid flow space of the axially extending passageway, the metering valve including a shaft holder, the shaft holder including a sleeve defining a central passageway for receiving the axially movable shaft member, and at least two legs that extend axially and radially at an angle from the shaft member and
a biasing device for normally biasing the metering valve in the rest position, and for providing resistance to movement of the metering valve to the flow restricting position.

11. The flow control valve of claim 10 wherein the shaft holder includes at least two support legs extending between the sleeve and the body portion, the at least two legs defining apertures therebetween through which fluid can flow.

12. The flow control valve of claim 11 wherein the at least two legs serve as a downstream seat for the biasing device, and wherein the at least two legs define apertures that provide a straight flow path for water flowing between the upstream end of the spring and the metering valve.

13. The flow control valve of claim 12 wherein the shaft member for coupling the metering valve to the biasing device includes an axially extending interior passageway having an open upstream end, an open downstream end, and a generally constant diameter between the upstream end and the downstream end to permit fluid flowing through the valve to flow through the axially extending interior passageway of the shaft member.

14. A flow control valve for providing fluid control across a control range of varying fluid pressures, the flow control valve comprising
a body portion including a first end, a second end and an axially extending flow passageway,
a metering valve axially movable under the influence fluid pressure from a rest position wherein fluid can flow in the axially extending flow passageway around the metering valve to a flow restricting position wherein the metering valve can restrict the flow of fluid in the axially extending passageway around the metering valve
a biasing device for normally biasing the metering valve in the rest position and for providing resistance to movement of the metering valve to the flow restricting position, and
an axially moveable shaft member for functionally coupling the metering valve to the biasing device, the shaft member including an axially extending interior passageway having an open upstream end, an open downstream end and a generally constant cross sectional area between the upstream end and the downstream end to permit fluid flowing through the valve to flow through the axially extending interior passageway of the shaft member, wherein the flow control valve provides a low variance in the rate of fluid flow through the valve throughout the control range of varying fluid pressures.

15. The flow control valve of claim 14 wherein the metering valve includes an upstream portion and a downstream portion, the upstream portion having a flattened top spherical shape and the downstream portion has a frusto-conical shape.

16. The flow control valve of claim 14 wherein the axially moveable shaft member includes a first end coupled to the biasing device and a second end coupled to the metering valve, wherein the biasing device includes a spring and a biasing device seat for serving as an upstream seat for the spring, the biasing device seat including a central ring having a central aperture for receiving the upstream end of the shaft member, a perimetral ring member for receiving an upstream end of the spring, and at least two legs for serving as a downstream seat for spring, the at least two legs extending between the central ring and the perimetral ring at an oblique angle to the axially movable shaft member, and the at least two legs defining apertures therebetween through which fluid can flow.

17. The flow control valve of claim 14, wherein the axially extending interior passageway includes a generally constant cross sectional area between the upstream end and the downstream end.

18. A flow control valve comprising
a body portion including a first end, a second end and an axially extending flow passageway,
a metering valve axially moveable under the influence of fluid pressure from a rest position to a flow restricting position, wherein the metering valve can restrict the flow of fluid through the axially extending passageway,
a biasing device for normally biasing the metering valve into the rest position, and for providing resistence to movement of the metering valve to the flow restricting position,
an axially moveable shaft member for functionally coupling the metering valve to the biasing device, and
a shaft holder including a sleeve defining a central passageway for receiving the axially moveable shaft member, the shaft holder includes at least two support legs extending axially and radially at an oblique angle to a long axis of the axially movable shaft member between the sleeve and the body portion, the at least two legs defining apertures therebetween through which fluid can flow, in the axially flow extending passageway both interiorly and exteriorly of the biasing device.

19. The flow control valve of claim 18 wherein the biasing device comprises a spring having an upstream end and a downstream end, wherein at least one of the at least two legs serves as a seat for the downstream end of the spring.

20. The flow control valve of claim 18 wherein the metering valve includes an upstream portion and a downstream portion, the upstream portion having a flattened top spherical shape and the downstream portion having a frusto-conical shape, and the axially moveable shaft member includes an axially extending interior passageway having an open upstream end and an open downstream end to permit fluid flowing through the valve to flow through the axially extending interior passageway of the shaft member.

21. The flow control valve of claim 18 wherein the axially movable shaft member includes a long axis extending generally parallel to the direction of axial movement of the axially movable shaft member, the biasing device comprises a spring, and the at least two legs comprise at least three legs, each of which extends between the sleeve and the body portion at an oblique angle to the long axis of the axially movable shaft member, and wherein at least three of the at last three legs serves as a downstream seat for the spring.

22. A flow control valve comprising
a body portion including a first end, a second end and an axially extending flow passageway,
a metering valve axially moveable under the influence of fluid pressure from a rest position to a flow restricting position, wherein the metering valve can restrict the flow of fluid through the axially extending passageway,
a biasing device for normally biasing the metering valve into the rest position, and for providing resistance to movement of the metering valve to the flow restricting position,
an axially moveable shaft member for functionally coupling the metering valve to the biasing device, and
a shaft holder including a sleeve defining a central passageway for receiving the axially moveable shaft member, the shaft holder includes at least two support legs extending axially and radially between the sleeve and the body portion, the at least two legs defining apertures therebetween through which fluid can flow, in the axially flow extending passageway both interiorly and exteriorly of the biasing device,
wherein the metering valve includes an upstream portion and a downstream portion, the upstream portion having a flattened top spherical shape and the downstream portion having a frusto-conical shape, and the axially moveable shaft member includes an axially extending interior passageway having an open upstream end and an open downstream end to permit fluid flowing through the valve to flow through the axially extending interior passageway of the shaft member, and
wherein the first end of the body portion is an upstream end, and the second end of the body portion is a downstream end when the flow control valve is disposed in a fluid system, wherein the axially extending passageway includes a relatively reduced diameter portion disposed relatively closer to the downstream end, and a relatively enlarged diameter portion disposed relatively closer to the upstream end, the reduced diameter portion including a progressively reducing inner diameter, wherein the diameter of the reduced diameter portion adjacent to the enlarged diameter portion is restrictively greater than the diameter of the reduced diameter portion adjacent to the downstream end, the downstream end terminating in a minimum diameter portion, wherein the metering valve has a maximum diameter portion smaller than the minimum diameter portion to permit fluid to flow around the metering valve between the minimum diameter portion of the axially extending passageway and the maximum diameter portion of the metering valve.

23. A flow control valve comprising
a body portion including a first end, a second end and an interior surface defining an axially extending passageway having a minimum diameter portion,
a metering valve including an upstream portion, downstream portion and a side portion between the upstream portion and the downstream portion, the side portion including a maximum diameter portion smaller than the minimum diameter portion of the axial passageway to define a fluid flow space though which fluid can flow between the maximum diameter portion of the metering valve and the minimum diameter portion of the axially extending passageway, the upstream portion having a flattened top spherical shape, the metering valve being axially moveable within the axially extending passageway under the influence of fluid pressure from a rest position wherein flow of fluid through the valve is relatively unrestricted, to a flow restricting position wherein the metering valve can relatively restrict, while still permitting the flow of fluid through the fluid flow space of the axially extending passageway,
a biasing device for normally biasing the metering valve in the rest position, and for providing resistance to movement of the metering valve to the flow restricting position, and
an axially movable shaft member for functionally coupling the metering valve to the biasing device, the shaft member including an axially extending interior passageway having an open upstream end and an open downstream end to permit fluid flowing through the valve to flow through the axially extending interior passageway of the shaft member.

* * * * *